United States Patent [19]
Payor et al.

[11] Patent Number: 5,760,870
[45] Date of Patent: Jun. 2, 1998

[54] ROTATIONALLY STABILIZED CONTACT LENS AND METHODS OF LENS STABILIZATION

[75] Inventors: Rick Edward Payor, Lawrenceville; Xiaoxiao Zhang, Sewanee, both of Ga.; Lewis Williams, Mascot, Australia; Gary Lafferty, Cumming, Ga.

[73] Assignee: CIBA Vision Corporation, Duluth, Ga.

[21] Appl. No.: 829,784

[22] Filed: Mar. 31, 1997

Related U.S. Application Data

[63] Continuation-in-part of Ser. No. 404,785, Mar. 15, 1995, abandoned.

[51] Int. Cl.⁶ ............................................. G02C 7/04
[52] U.S. Cl. ........................... 351/160 H; 351/161
[58] Field of Search .................. 351/160 H, 160 R, 351/161, 177

[56] References Cited

U.S. PATENT DOCUMENTS

| | | | |
|---|---|---|---|
| 2,510,438 | 6/1950 | Tuohy | 351/160 R |
| 3,227,507 | 1/1966 | Feinbloom | 351/160 |
| 3,270,099 | 8/1966 | Camp | 351/161 |
| 3,489,491 | 1/1970 | Creighton | 351/160 R |
| 3,937,566 | 2/1976 | Townsley | 351/160 R |
| 4,095,878 | 6/1978 | Fanti | 351/161 |
| 4,332,443 | 6/1982 | Thomas | 351/160 H |
| 4,463,148 | 7/1984 | Höfer et al. | 526/264 |
| 4,874,234 | 10/1989 | Wichterle | 351/161 |
| 5,044,742 | 9/1991 | Cohen | 351/160 H |
| 5,069,542 | 12/1991 | Höfer et al. | 351/160 |
| 5,141,301 | 8/1992 | Marstad | 351/161 |
| 5,422,687 | 6/1995 | Tanaka et al. | 351/161 |
| 5,502,518 | 3/1996 | Lieberman | 351/161 |
| 5,635,998 | 6/1997 | Baugh | 351/161 |

FOREIGN PATENT DOCUMENTS

| | | |
|---|---|---|
| 0034939 | 9/1981 | European Pat. Off. |
| 0062178 | 3/1982 | European Pat. Off. |
| 2117130A | 2/1983 | European Pat. Off. |
| 618474A1 | 3/1994 | European Pat. Off. |

OTHER PUBLICATIONS

Remba, MJ: "Evaluating the Hydrasoft Toric", *Contact Lens Forum* (1987); 12: 45–51.

Mandell, Robert: "Hydrogel Lenses for Astigmatism", *Contact Lens Practice*, Fourth Ed., pp. 659–680 (1988).

Gasson, A. and Morris, J.: "Toric Soft Lenses", *The Contact Lens Manual: A Practical Fitting Guide*, pp. 196–207 (1992).

Erickson, P. and Robboy, M.: "Performance Characteristics of a Hydrophilic Concentric Bifocal Contact Lens", *Am. J. of Optometry & Physiological Optics*, vol. 62, No. 10, pp. 702–708.

Bennett, E. and Weissman, B.: "Toric Hydrogel Lens Correction", *Clinical Contact Lens Practice*, Ch. 41, pp. 1–12.

Mandell, Robert B; *Contact Lens Practice—Hard and Flexible Lenses*; Second Edition; 1974; pp. 388–391.

*Primary Examiner*—Georgia Y. Epps
*Assistant Examiner*—Jordan M. Schwartz
*Attorney, Agent, or Firm*—Michael U. Lee; R. Scott Meece

[57] ABSTRACT

Contact lenses, especially toric and bifocal, which are rotationally stabilized and methods of stabilizing contact lenses. Contact lenses are stabilized, with respect to rotation while in place on the eye, by providing the lenses with a non-circular shape. In a preferred embodiment, a toric contact lens is rotationally stabilized by providing the lens with an oval shape. Also disclosed are methods of providing non-circular lenses with appropriate shapes for proper fit to a patient's eye.

9 Claims, 7 Drawing Sheets

5,760,870

ROTATIONALLY STABILIZED CONTACT LENS AND METHODS OF LENS STABILIZATION

This application is a Continuation-In-Part of application Ser. No. 08/404,785, filed on Mar. 15, 1995 now abandoned. Priority is claimed to the parent application under 35 U.S.C. 120.

BACKGROUND OF THE INVENTION

1. Field of the Invention

This invention relates broadly to ophthalmic lenses which are rotationally stabilized while the lenses are in position in the ocular environment. More specifically, this invention relates to methods and designs for stabilizing toric contact lenses for the correction of astigmatism and multifocal contact lenses for the correction of presbyopia.

2. Description of the Related Art

The use of ophthalmic lenses, such as contact lenses, to correct vision is well known in the art. Many patients may be properly fitted with contact lenses which are substantially spherical and have a uniform power, i.e., contact lenses which are designed to fit a substantially spherical eye. However, certain patients suffer from a condition known as an astigmatism. An astigmatic patient has an eye which has an irregular shape, i.e., the eye is non-spherical. These patients require specialized contact lenses, known as toric lenses.

A toric lens typically has a surface which is essentially a torus, i.e., the lens has two cylindrical curvatures, whose axes are oriented substantially perpendicularly to each other. In order to properly correct astigmatism, a toric lens must be oriented in the design position on the eye. In the event the lens rotates slightly, either in a clockwise or counter-clockwise fashion with respect to the design orientation, the patient's vision will be substantially impaired.

Also, certain patients require lenses which impart more than one power. For example, elderly patients are more likely to require bifocal lenses which are capable of providing a first power in a first region for reading, and a second power in a second region for viewing distant objects. Therefore, in the case of toric lenses and some bifocal lenses, it is important to maintain the lens in a specific location on the eye.

Previous techniques for rotationally stabilizing contact lenses include those disclosed in *Contact Lens Practice*, fourth ed., Robert Mandell, pp. 661–2 (1988). Mandell discloses two general methods of stabilizing rotation: the prism ballast and the thinning of the superior and inferior periphery. In the prism ballast method, Mandell states that the thicker portion (base) of the prism will move to a downward position as a result of gravity. Such a prism ballast lens may optionally include an inferior truncation. Typically, the truncation is intended to remain horizontal while the lens is in position on a patient's eye, so that the truncation appears to lie along the top or bottom of the lens as positioned in the eye. The truncated lenses produce poor rotational stability because the lens truncation line may ride above or below the eyelid margins. Also, truncated lenses cause patient discomfort because of the increased abrasion between the lens and the eyelid.

U.S. Pat. No. 4,874,234, issued Oct. 17, 1989 to Wichterle, and U.S. Pat. No. 4,095,878, issued Jun. 20, 1978 to Fanti, disclose methods of rotationally stabilizing contact lenses which involve the thinning of the lens periphery (i.e., "slab-off" techniques). Wichterle teaches adding weight to the desired bottom of the lens, so that gravitational forces would maintain the lens in the proper orientation. Fanti seeks to maintain rotational stability via eyelid interaction with the thickened areas of the lens. However, thickened areas of a lens reduce oxygen permeability, which is necessary for good corneal health. Further, undesirable changes in optical power may occur when the thickened area of the lens flexes to fit the eye (See generally, M. Remba, "Evaluating the Hydrasoft Toric", *Contact Lens Forum*, pp. 45–51, March, 1987).

While various methods have been suggested for stabilizing a contact lens in a proper orientation, there remains a need for rotationally stabilized contact lenses and methods of stabilizing contact lenses which do not suffer from the disadvantages of the prior art, such as inadequate stabilization, decreased oxygen permeability, variations in optical power, and increased patient discomfort.

SUMMARY OF THE INVENTION

An object of the invention is to provide a means for stabilizing an ophthalmic lens which requires stabilization while in the ocular environment.

Another object of the invention is to provide a rotationally stabilized toric contact lens.

Yet another object of the invention is to provide a rotationally stabilized multifocal contact lens.

A further object of the invention is to provide rotationally stabilized lenses and lens stabilization methods which do not add significantly to the lens inhibition of oxygen penetration to the cornea.

Yet a further object of the invention is to provide rotationally stabilized lenses and lens stabilization methods which do not require more complicated fitting and handling techniques.

An additional object of the invention is to provide rotationally stabilized lenses and lens stabilization methods without modifying the lens power.

Even another object of the invention is to provide a method and design for comfortably fitting a rotationally stabilized lens having an oval edge in plan view.

One embodiment of the invention is an ophthalmic lens which is rotationally stabilized when placed in the ocular environment by the non-circular shape of the lens. The dimensions of the lens are chosen such that the lens is longer across a section which is intended to remain substantially horizontal when placed on the eye, and shorter across a section which is intended to remain substantially vertical when placed on the eye. In a preferred embodiment, the invention is a toric contact lens having a substantially oval shape, i.e., having a long axis which is intended to remain substantially horizontal when in position on the eye, and a short axis which is intended to remain substantially vertical when in position on the eye. The short axis is substantially perpendicular to the long axis.

Another embodiment of the invention is a method of stabilizing an ophthalmic lens in position on an eye such that the lens does not rotate substantially while worn. The method involves providing an ophthalmic lens with a non-circular shape, such that the blinking of the wearer's eyelid, in conjunction with the lens shape, maintains the lens in a substantially stable position on the eye with respect to rotation about the center of the lens. In a preferred embodiment, the method involves imparting a substantially oval shape to a toric contact lens to provide rotational stability.

A further embodiment of the present invention is a method of providing a non-circular rotationally stabilized lens with proper fit to a patient's eye. The lens has an inner portion designed to correct the patient's vision and an outer portion designed to rotationally-stabilize the lens on the eye. The method includes providing the inner vision correction portion with a first radius selected for proper fit to the portion of the eye which is intended to be adjacent to said inner vision correction portion. The method also includes providing the outer rotational-stability portion with a second radius selected for proper fit to the portion of the eye which is intended to be adjacent to said outer rotational-stability portion.

Yet another embodiment of the present invention is a multifocal lens which is rotationally stabilized by a non-circular peripheral edge, preferably an oval in plan view. The preferred multifocal lens is a bifocal lens. In one embodiment, each of the focal zones is decentered from the lens center, such that the center of each focal zone is aligned with the optical axis of the eye.

DESCRIPTION OF THE PREFERRED EMBODIMENTS

Figure 1:
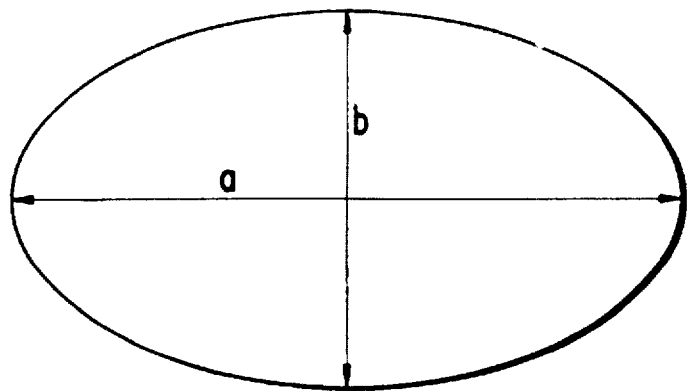
FIG. 1 is a plan view of a rotationally stabilized lens having a periphery defining an oval in plan view.

The present rotationally-stabilization teachings may be utilized in a variety of contact lenses. However, rotational stabilization is especially desirable in toric or multifocal (e.g., bifocal) contact lenses. Toric lenses have more than one radii of curvature throughout the lens, in order to correct a patient's astigmatism (i.e., non-spherical aberrations in a patient's eye). Accordingly, in order to achieve the best vision, a toric lens must be properly positioned on a patient's eye to correct for aberrations in localized area. Thus, a toric lens will have a first radius of curvature "$r_1$" in one direction, and a second radius of curvature "$r_2$" in a second direction which is substantially perpendicular to the first direction.

The rotationally stabilized contact lenses of the present invention are soft contact lenses. Soft contact lenses have a diameter greater than that of the cornea, i.e., greater than about 10 to about 12 mm. Hydrophilic lenses, i.e., those lenses having a water content of greater than about 10 weight percent, are soft contact lenses. Also, many silicone-containing lenses are soft contact lenses. Hydrophilic materials (e.g., 2-hydroxyethyl methacrylate or HEMA) and silicone polymers are well known in the art. A preferred method of manufacture of soft contact lenses is by double-sided molding.

The term "radius of curvature", as used herein means an equivalent radius of curvature defined by a circle through two end points and a high point on a curve. Thus, for a curve which is an arc of a circle, the equivalent radius is the radius of the circle. However, for a curve whose points do not entirely correspond to an arc of a circle, the equivalent radius is defined as the radius of a circle which passes through the end points of the curve and a point having the longest perpendicular distance from a line between the end points of the curve. The equivalent radius of curvature, or merely radius of curvature as used herein, approximates the surface defined by the curve.

It should also be noted that the term "base curve" is well known in the art and refers to the posterior surface of the lens (i.e., the surface which is located immediately adjacent the surface of the eye when in use). The term "front curve" refers to the opposite surface, and also may be called the anterior surface.

Rotational stability is similarly important for multifocal (e.g., bifocal) contact lenses. For a single object, bifocal lenses deliver two images, each at its own vergence distance with respect to the eye. Misalignment of these images with respect to the eye's visual axis causes the patient to experience double images (i.e., diplopia) because of image parallax. While on the eye, conventional lenses are located temporal (away from the nose) and inferior to (below) the eye's pupil and visual axis (See generally, P. Erickson and M. Robboy, "Performance Characteristics of a Hydrophilic Concentric Bifocal Contact Lens", Am. J. of Optometry & Phsiological Optics, vol. 62, no. 10, pp. 702–8 (1985)). Thus, in order to inhibit or prevent diplopia, bifocal lenses must have the optical area displaced from the lens' geometric center such that the bifocal optics are aligned with the eye's visual axis. Therefore, rotational stability is highly important in bifocal lenses which inhibit diplopia.

The invention may be understood more easily with reference to the drawings. FIG. 1 illustrates a plan view of a rotationally stabilized contact lens having an oval edge periphery shape in plan or top view, with a first axis of length "a" and a second axis of length "b". The oval is defined by the edge or periphery of the lens in a view through the visual axis of the lens.

Figure 2:
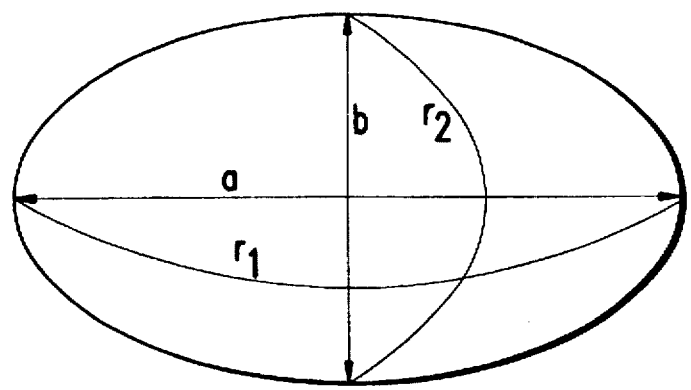
FIG. 2 is a plan view of an oval rotationally stabilized toric lens which is toric across the entire lens surface.
Figure 3:
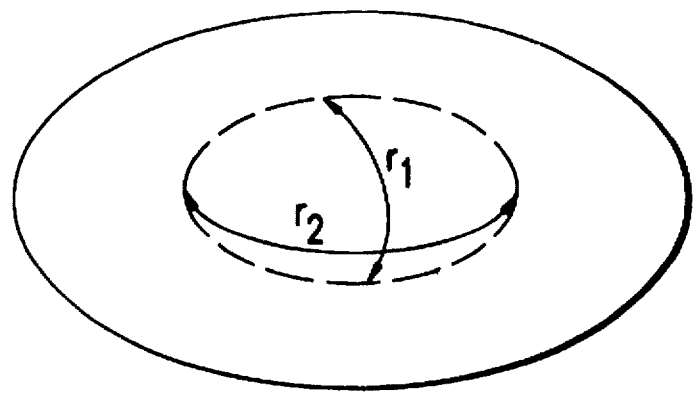
FIG. 3 is a plan view of an oval rotationally stabilized toric lens having a central toric area with toric radii corresponding to oval axes.
Figure 4:
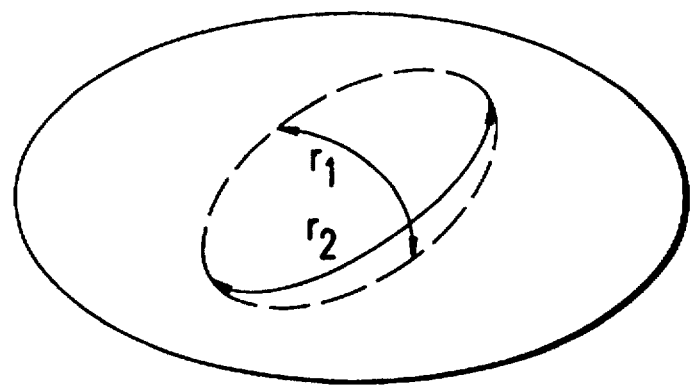
FIG. 4 is a plan view of an oval rotationally stabilized toric lens having a central toric area with toric radii which do not correspond to oval axes.

FIGS. 2–4 illustrate a variety of designs of toric rotationally stabilized lenses useful in accordance with the present invention. FIG. 2 shows a lens which is toric over the entire surface of the lens. While the toric radii, $r_1$ and $r_2$, are shown as corresponding with the oval edge axes of length "a" and "b", this is not a requirement of the present invention.

FIG. 3 illustrates a rotationally stabilized lens having a toric surface only in a central optical area of the lens. The toric radii of FIG. 3 are shown corresponding to the oval edge axes. Thus, toric radius of curvature "$r_1$" along the lens surface is aligned with long axis "a" defined by the lens edge, while toric radius of curvature "$r_2$" is aligned with short axis "b", as shown in FIGS. 1 and 2. While this alignment of the toric radii with the oval axes is suited to patients having so-called "against-the-rule" and "with-the-rule" astigmatism (i.e., elongation either in the vertical or horizontal directions), such alignment is not a requirement of the invention.

FIG. 4 shows an alternative embodiment in which the toric radii do not correspond to the oval edge axes. This embodiment is suited to correcting vision in patients having so-called "oblique" astigmatism, a conditions in which the eye has elongated areas which do not correspond to the horizontal or vertical axes of the eye (with the vertical axis being parallel to an axis of bilateral symmetry of the body). Regardless of the axes of ocular astigmatism, the toric area of the lens is provided for correcting the astigmatism, while the present innovative oval peripheral lens edge maintains the toric area in appropriate orientation on the eye to correct the astigmatism.

Figure 5:
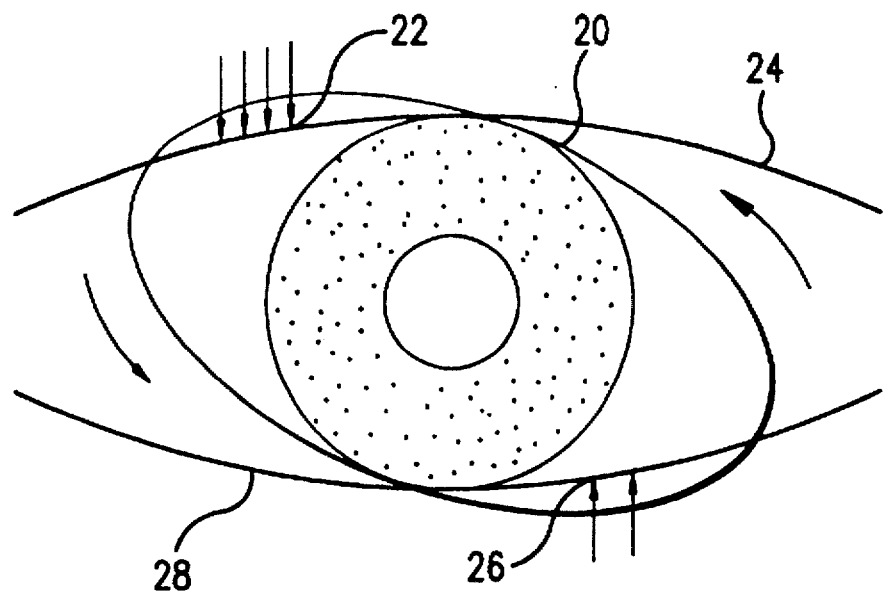
FIG. 5 is a plan view of a rotationally stabilized oval lens which is misplaced on a patient's eye.
Figure 6:
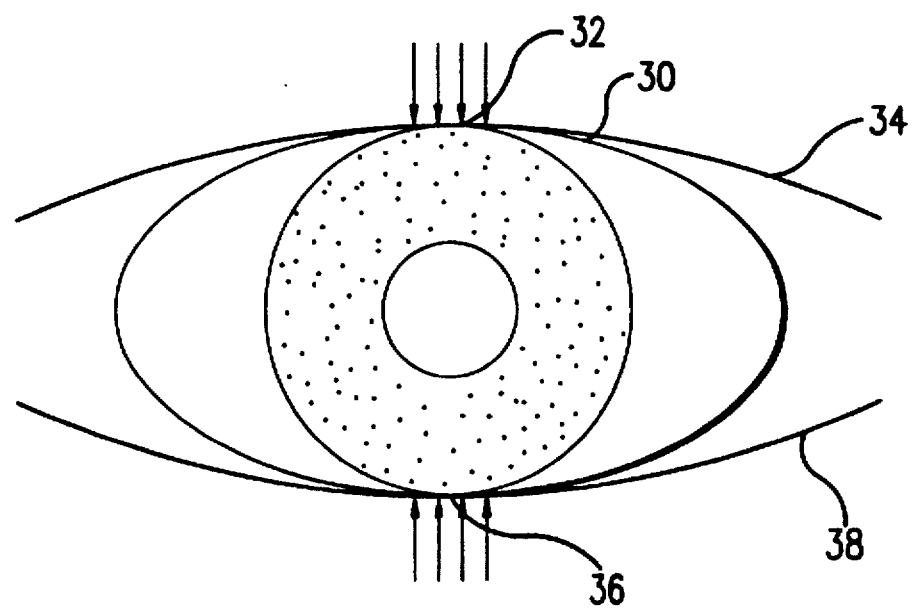
FIG. 6 is a plan view of a rotationally stabilized oval lens which is in the desired orientation on a patient's eye.

The dynamic rotational stabilization features of the present invention may be understood with reference to FIGS. 5 and 6. FIG. 5 shows oval contact lens 20 mispositioned on a patient's eye. The upper eyelid 24 and lower eyelid 28 are shown contacting the lens at positions 22 and 26, respectively. During involuntary or reflex blinking, it is believed that the upper eyelid imparts a downward force on one side of the lens at position 22, while the lower eyelid imparts an upward force on the other side of the lens at position 26. These forces cause the lens to rotate counter-clockwise, back into a position in which the long axis is substantially horizontal, while the short axis is substantially vertical, as shown in FIG. 6. (Note that it is believed that the upper eyelid provides the bulk, if not all, of the rotational force.) Thus, any rotational misorientation of the lens places the lens in a position in which imbalanced forces are imparted to the lens upon patient blinking. This imbalance of forces continues, causing the lens to rotate, until the lens is repositioned into a correct orientation by the blinking forces.

As FIG. 6 illustrates, when the lens is appropriately oriented on the eye, the forces on the lens are substantially balanced. This balancing of forces prevents the lens from rotating into an undesirable position. In the event an extraneous force causes the lens to temporarily rotate into a slightly misadjusted position, such as shown in FIG. 5, the blinking of the patient's eyelids will impose forces as shown in FIG. 5 to automatically readjust the lens position.

Figure 7:
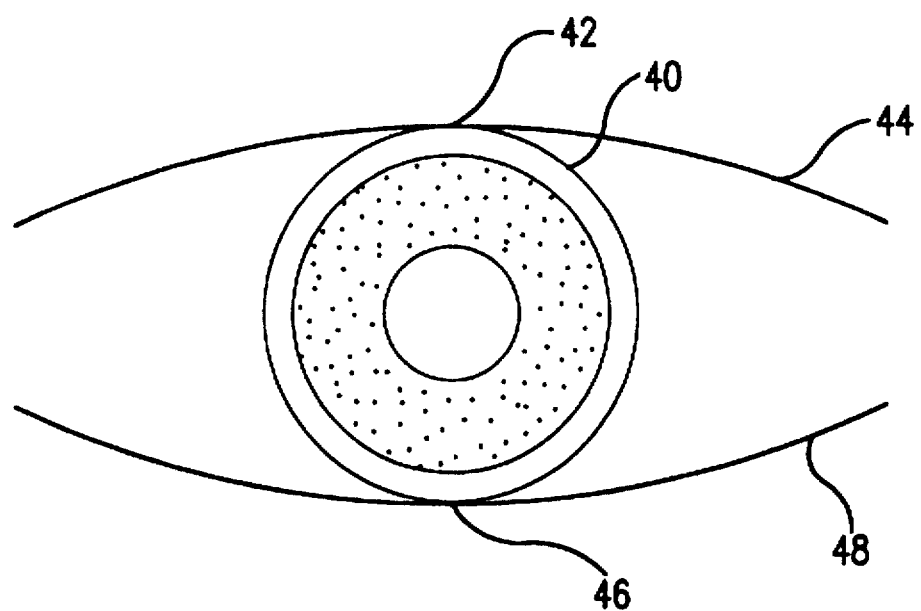
FIG. 7 is a plan view of a prior art circular lens on a patient's eye.

In contrast, FIG. 7 illustrates a substantially circular lens of the prior art. While a patient's eyelids will impart forces on the lens during blinking, the forces will neither inhibit nor promote rotation of the lens. As may be envisioned from FIG. 7, regardless of the rotational orientation about the center of the lens, the force exerted by the eyelids 44 and 48 will be centrally located on the lens at or near positions 42 and 46 respectively. Centrally-located forces from blinking will not cause any rotation and re-orientation of the lens when the lens is rotationally mispositioned. Hence, slight extraneous forces on such prior art circular lenses may cause the lens to rotate into an undesirable position, and blinking will not correct this misorientation.

As mentioned previously, prior art attempts to impart rotational stability included thickening the lens at some region, which region may be located at the bottom of the eye. However, these prior art thickening techniques have problems which include patient discomfort, undesirable power variations, and reduced oxygen permeability in the thickened regions. In contrast, the present invention avoids thickening or truncating the lens, and thereby avoids problems associated with these methods.

Thus, one embodiment of the present invention is a rotationally stabilized contact lens, having a non-circular shape defined by the lens edge in plan or top view, in which the lens has a first dimension in a first cross-section of the lens and a second dimension in a second cross-section of the lens. The first cross-section is substantially perpendicular to the second cross-section, both cross-sections being perpendicular to the plane defined by the edge periphery in plan view. The first dimension is longer than the second dimension, so that the lens is maintained substantially rotationally stable when placed on a patient's eye. While on the eye, the lens holds a position with the cross-section having the longer first dimension remaining substantially horizontal, and the cross-section having the shorter second dimension remaining substantially vertical.

The peripheral lens shape (defined by the lens edge) may be chosen from a wide variety of shapes having the long and short dimensioned sections as described above. For example, the lens may have a substantially rectangular shape, a rounded-corner rectangular shape, or an oval shape. The preferred lens shape is oval. Moreover, it is not a requirement of the present invention that the lens edge lie in one plane. The oval shape of the edge is defined by a view looking down on the lens, i.e., through the axis of vision of the lens (plan or top view).

The preferred oval-like rotationally stabilized contact lens of the present invention has a peripheral edge defining an oval-like shape (from a plan view) with a long axis in a first direction, and a short axis in a second direction which is substantially perpendicular to the first direction. The long axis "a" is preferably from about 14 to about 20 millimeters, while the short axis "b" is preferably from about 13 to about 15 millimeters. More preferably, the long axis "a" is about 16 to about 18 millimeters, while the short axis "b" is about 13.5 to about 14.5 millimeters.

The radii of curvature of the toric lens depend upon the patient's eye characteristics. The design of toric contact lenses is described more fully in *Contact Lens Practice*, Fourth Ed., Robert Mandell, pp. 659–680 (1988); *The Contact Lens Manual*, A. Gasson and J. Morris, pp. 196–207 (1992); and *Clinical Contact Lens Practice*, revised ed., E. Bennett and B. Weissman, pp. 1–12 (1993); each of which are incorporated herein by reference.

The rotationally stabilized contact lenses of the present invention may be fabricated by any number of techniques, such as double-sided molding, conventional mechanical lathing, or excimer laser-ablative lathing techniques. Preferrably, the oval rotationally stabilized contact lenses are formed by double-sided molding techniques, because the more complex oval shape is more suited to certain molding techniques.

In a preferred embodiment, the present rotationally stabilized toric lens has one radius of curvature, $r_i$, in a substantially-spherical, inner, vision-correction portion, and a second radius of curvature, $r_o$, in a rotation-stabilizing outer portion, e.g., in an outer area having an edge which defines the preferred oval shape. The differing radii of curvature may be required for proper fit of the oval-like rotationally stabilized lens to a patient's eye. For example, in some instances, the internal radius of curvature, $r_i$, will be too small, and thus, will cause the lens to exert excessive pressure on the eye. This excessive pressure may cause the lens to distort or indent ocular tissue, especially at the lens periphery. In other cases, the internal radius of curvature will be too large, so that if this internal radius extends uniformly from the lens center to the edge, the lens will fit the eye properly in the center, but will buckle or raise off the eye at the lens edge.

Figure 8:
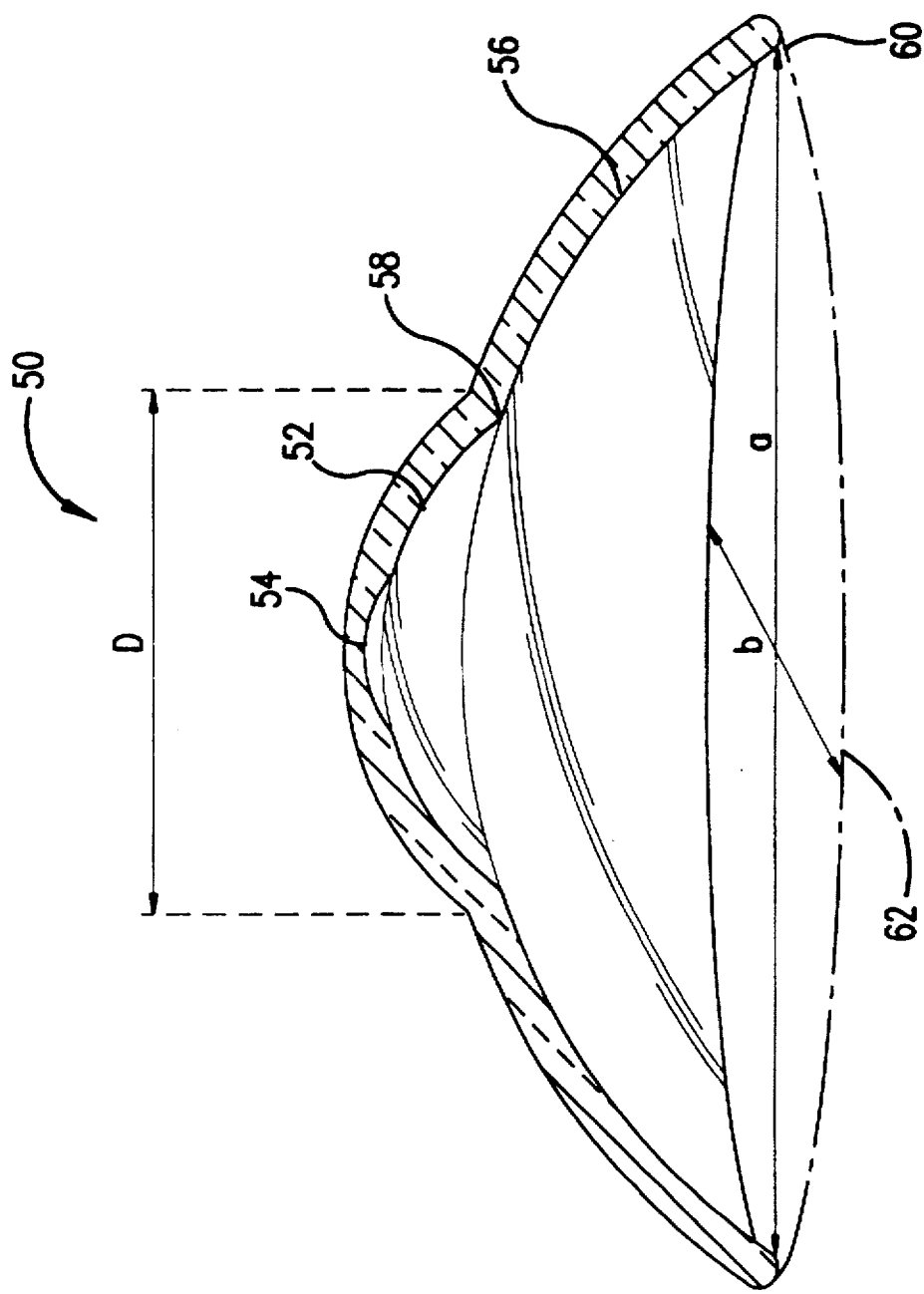
FIG. 8 is a sectional view of an oval rotationally stabilized toric contact lens.
Figure 9:
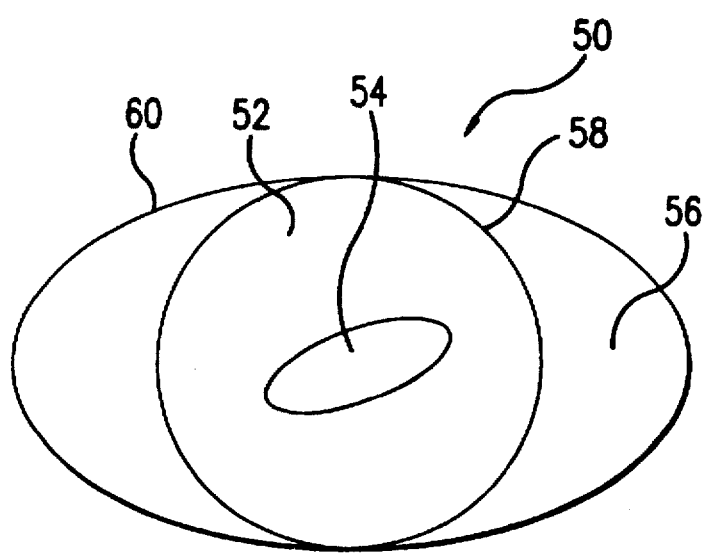
FIG. 9 is a bottom view of the lens of FIG. 8.

Thus, in a preferred embodiment shown in FIGS. 8 and 9, oval-like rotationally stabilized toric lens 50 has a first inner radius of curvature, $r_i$, in inner vision-correction portion 52. Vision-correction portion 52, which is typically substantially spherical, is centrally-located and includes toric surface 54.

This preferred lens has a second outer radius of curvature, $r_o$, differing from the first inner radius, in rotationally stabilizing outer area 56, extending from inner vision-correction portion 52 at periphery 58 to peripheral lens edge 60. Peripheral lens edge 60 defines oval shape 62 which provides rotational stability to lens 50. FIGS. 8 and 9 illustrate the overall lens edge having a preferred oval shape with major axis of length "a" and minor axis of length "b", where a>b.

A preferred inner vision-correction area may be defined as an area extending spherically from the lens center to a periphery. The diameter of the inner vision-correction area, in plan view, may range from about 11 to 15 mm. This diameter is shown as "D" in FIG. 8. More preferably the inner vision-correction area has a diameter of 12 to 14.5 mm.

The dimensions of the inner and outer radius which will produce a proper fit to a particular patient are clearly dependent upon the characteristic shape of the patient's eye. However, generally, the inner area radius of curvature, $r_i$, may range from about 7 mm to about 10 mm, while the outer area radius of curvature, $r_o$, may range from about 8 mm to about 13 mm. More preferably, the inner radius is between 7.5 and 9.5 mm, and the outer radius is between 9 and 11 mm.

Figure 10:
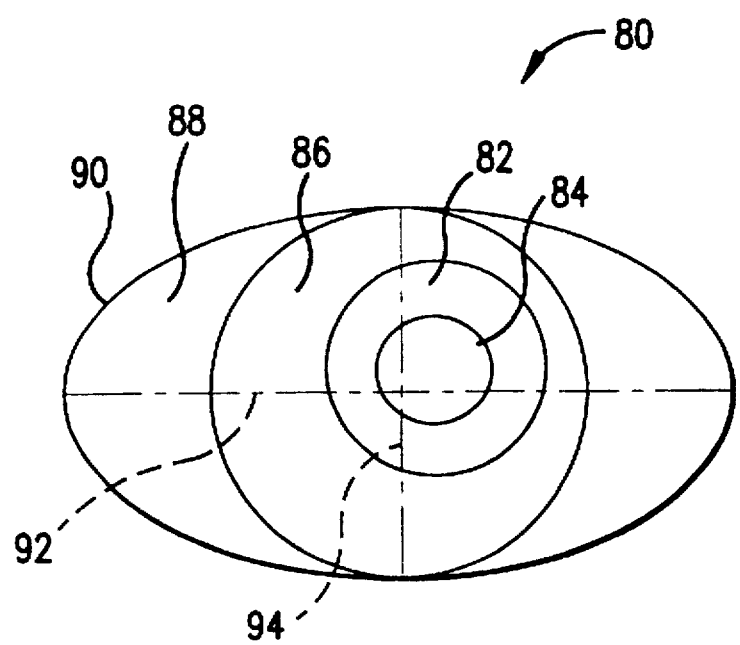
FIG. 10 is a top plan view of a rotationally stabilized bifocal lens.

In yet another embodiment, a multifocal lens is rotationally stabilized by providing the lens with a non-circular peripheral edge, as described above. As shown in FIG. 10, bifocal lens 80 includes an inner vision-correction portion 86 having a diameter of 11 to 15 mm and a base-curve radius of curvature of 7 to 10 mm. Lens 80 further includes an outer rotational-stabilization portion 88 extending from inner vision-correction portion 86 to oval edge 90. Within inner vision-correction portion 86 are first and second vision-correction regions 82 and 84. First vision-correction region 82 preferably has a diameter of 7 to 9 mm in plan view and a base-curve radius of curvature of 7 to 9.5 mm. Second vision-correction region 84 preferably has a diameter of 2 to 4 mm in plan view and a base-curve radius of curvature providing a 1 to 3.5 diopter power difference from the first vision-correction region 82.

As discussed previously, in order to avoid or minimize diplopia, bifocal lenses should be designed such that the focal optics are aligned with the eye's visual axis. Accordingly, first and second vision-correction regions 82 and 84 are preferably offset from the center of the lens such that the centers of these vision-correction regions substantially corresponds to the center of the patient's visual axis. To achieve this alignment, the centers of vision-correction regions 82 and 84 are preferably offset about 1 to 2 mm to the nasal side (i.e., to the right side for a left-eye lens, or to the left side for a right-eye lens) of minor oval edge axis 94, and offset 0.5 to 2 mm above major oval edge axis 92. However, the vertical offset of the vision-correction region centers may be above or below the major oval edge axis 92, depending on the particular characteristics of the patient's eye.

The previous disclosure will enable one having ordinary skill in the art to practice the invention. In order to better enable the reader to understand specific embodiments and the advantages thereof, reference to the following examples is suggested.

EXAMPLE I

An oval contact lens was fabricated with the lens peripheral edge defining an oval having a long axis of about 14.5 millimeters and a short axis of about 13 millimeters. The lens was fabricated with a base curve radius of curvature of 8.9 millimeters over the entire lens surface.

The lens produced an unexpected, undesirably-flat fitting in the short axis, resulting in "edge stand-off", a condition in which the lens edge does not remain in intimate contact with the eye. This result illustrates that proper fitting may require providing the lens with one radius of curvature, $r_i$, in an inner vision-correction portion, and a second radius of curvature, $r_o$, in an outer rotation-stabilizing portion.

EXAMPLE II

An oval, rotationally stabilized lens is fabricated with the lens back surface (base curve) being a true toric surface. The toric surface has a radius of 8.74 mm along one cylinder axis and 9.42 mm along the other cylinder axis.

An advantage of this design is that manufacturing complexities may be reduced because the entire surface is toric, rather than only a central area. However, the design is believed disadvantageous because both the cylinder power and fit are changed as the toric radii are changed. Thus, in order to provide proper vision correction to many patients, an additional toric surface may be required on the front curve of the lens, thereby increasing manufacturing complexities and cost.

EXAMPLE III

An oval contact lenses was fabricated with the lens peripheral edge defining an oval having a long axis of 15.8 millimeters and a short axis of 13.8 millimeters. The lens was provided with a radius of curvature of 8.74 mm for the inner vision-correction portion (i.e., an equivalent radius at diameter 13.8 mm). The lens was also provided with a radius of 9.42 mm in the outer rotation-stabilizing portion (i.e., an equivalent radius at diameter 15.8 mm).

The equivalent radii of curvature for the vision-correction portion and the rotation-stabilizing portion were achieved by providing a true radius of curvature of 8.45 mm from the lens center to an 11 mm diameter (in plan view); providing a true radius of curvature of 8.80 mm from the 11 mm diameter to a 13.5 mm diameter; and providing a true radius of curvature of 11 mm extending from the 13.5 mm diameter to the lens edge.

Both long and short axes fit well on the eye, producing no substantial ocular distortion or lens "edge stand-off".

EXAMPLE IV

An oval rotationally stabilized contact lens is fabricated as described in Example III, with the addition of a toric surface to the base curve of the lens. The toric area imparts a 1.00 diopter cylinder power difference between the major and minor axes of the oval edge. In plan view, the radii of the toric area are aligned with the major and minor axes of the oval edge, encompassing about 9 mm along the major axis and about 8 mm along the minor axis.

EXAMPLE V

An oval bifocal contact lens is fabricated in accordance with the description of the rotational-stabilization features of Example III. Using the rotational stabilization structure of Example III, a bifocal optical region is added to the lens base curve. A first vision-correction region of 8.0 mm diameter (in plan view) imparts a −3.0 diopter power. A second vision-correction region of 2.3 mm diameter imparts a 2.0 diopter power increase over the first region. The centers of the vision-correction regions are offset from the lens center 1.4 mm to the nasal side of the lens' minor oval edge axis and 1.0 mm above the lens' major oval edge axis.

The invention has been described in detail, with reference to certain preferred embodiments, in order to enable the reader to practice the invention without undue experimentation. However, a person having ordinary skill in the art will readily recognize that many of the components and parameters may be varied or modified to a certain extent without departing from the scope and spirit of the invention. Furthermore, titles, headings, or the like are provided to enhance the reader's comprehension of this document, and should not be read as limiting the scope of the present invention. Accordingly, the intellectual property rights to this invention are defined only by the following claims and any reasonable extensions thereof.

That which is claimed is:

1. A rotationally stabilized soft contact lens, having a non-circular peripheral edge shape, in which the lens periphery has a first dimension in a first cross-section of the lens and a second dimension in a second cross-section of said lens, wherein both the first and the second cross-sections lie in planes which are substantially parallel to the direction of the vision path through said lens, wherein the first cross-section is substantially perpendicular to the second cross-section, and wherein the first dimension is longer than the second dimension, whereby the non-circular edge shape allows said lens to remain substantially rotationally stable when placed on a patient's eye, with the cross-section having the longer first dimension remaining substantially horizontal while said lens is on the eye, wherein the second dimension of said lens is larger than the diameter of the cornea, wherein said lens includes a central vision-correction portion having a first radius of curvature on the posterior surface of said lens and said lens further includes a peripheral rotation-stabilizing portion having a second radius of curvature on the posterior surface of said lens, wherein said peripheral rotation-stabilizing portion extends from said central vision-correction portion to the edge of said lens, wherein said first radius differs from said second radius, wherein said lens edge periphery has a substantially oval shape from a top view, having a long axis in the first cross-section and a short axis in the second cross-section, and wherein said long axis is 14 to 20 millimeters and said short axis is 13 to 15 millimeters.

2. A rotationally stabilized soft contact lens of claim 1, wherein said long axis is 16 to 18 millimeters, and said short axis is 13.5 to 14.5 millimeters.

3. A rotationally stabilized soft contact lens of claim 1, wherein said first radius is smaller than the said second radius, said first radius is between 7 and 15 mm in said inner vision-correction portion, and said second radius is between 8 and 13 mm in said outer rotation-stabilizing portion.

4. A rotationally stabilized soft contact lens of claim 3, wherein said first radius is between 7.5 mm and 9.5 mm, and said second radius is between 9 and 11 mm.

5. A rotationally stabilized soft contact lens of claim 2, further including:

a toric surface, and an inner vision-correction portion having a first radius of curvature between 7.5 and 9.5 mm, and an outer rotation-stabilizing portion having a second radius of curvature between 9 and 11 mm, wherein said outer rotation-stabilizing portion extends from said inner vision-correction portion to the edge of said lens.

6. A rotationally stabilized soft contact lens of claim 1, wherein said central vision-correction portion comprises a first vision-correction region and a second vision-correction region, and wherein each of said vision-correction regions has a center of said region.

7. A rotationally stabilized soft contact lens of claim 6, wherein said vision-correction regions are offset from the center of said lens such that the centers of said vision-correction regions substantially corresponds to the center of the patient's visual axis.

8. A rotationally stabilized soft contact lens of claim 7, wherein the centers of said vision-correction regions are offset toward the patient's nasal side.

9. A rotationally stabilized soft contact lens of claim 7, wherein the centers of said vision-correction regions are offset about 1 mm to 2 mm to the patient's nasal side.

* * * * *